ANTI-VIBRATING CHECK VALVES
Original Filed April 8, 1952
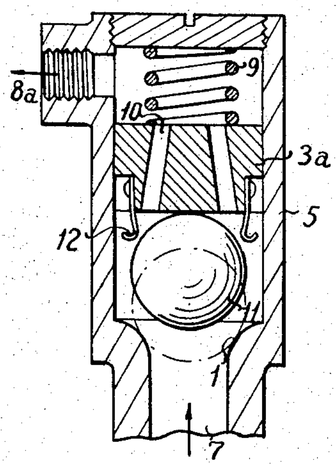
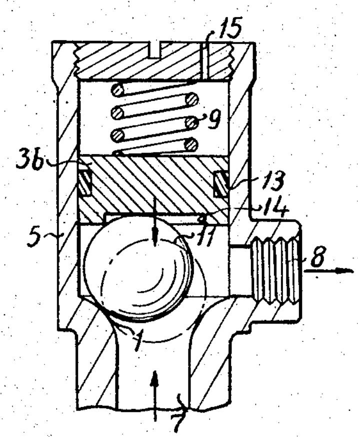
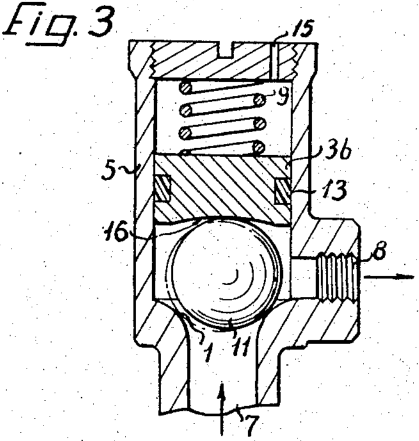
Inventor
J. Mercier
By Glascock Downing & Seebold
Attys.

United States Patent Office 2,914,085

Patented Nov. 24, 1959

2,914,085

ANTI-VIBRATING CHECK VALVES

Jean Mercier, New York, N.Y.

Original application April 8, 1952, Serial No. 281,118, now Patent No. 2,714,392, dated August 2, 1955. Divided and this application May 3, 1955, Serial No. 508,097

2 Claims. (Cl. 137—514)

This invention relates to valves.

This application is a divisional of the parent application Serial No. 281,118, now Patent No. 2,714,392, dated August 2, 1955.

One of the objects of my invention is to ensure a good seal between the movable valve member and the valve seat by provision of means for the compensation of possible defects of alignment between the seat and the movable member.

Another object of my invention is to avoid the deformation of the circular area of said seat on which said movable member bears in the ultimate closed position by the shocks occuring during the approach of the movable valve member towards its seat.

Still another object of my invention is to reduce the vibrations of the movable valve member when the same is submitted to variable pressure conditions.

With these objects in view the valve seat is given the shape of a convex revolution surface, while the active surface of the movable valve member is given the shape of a sphere, means being provided to allow an alignment of said spherical surface in respect to said convex surface and dampen the vibrations of said movable member.

When the pressure is lowered sufficiently, the movable valve member is urged towards its seat by a spring and, assuming a defect of alignment between its and the seat axes, comes in contact with a portion of the seat different from the portion on which it will rest in the ultimate closing position.

Due to the vibrations damping means and alignment facilities provided, the movable valve member may be displaced by the fluid pressure and is brought into its ultimate closing position, without deforming the useful sealing area of the seat. Thus, a perfect seal along a linear undeformed circular area is always established without objectionable deformations and wear of the active area of the seat.

The valve according to my invention comprises a piston slidably mounted in a bore coaxial with the convex revolution surface of the seat, said piston being mounted in said bore with a fit ensuring a dampening of the vibrations of said movable member under variable fluid pressure conditions, and means to assure radial alignment of the spherical active surface of the movable valve member in respect to said seat.

According to one embodiment of my invention, the movable member is constituted by two separate parts, one having the shape of a piston slidably mounted in a bore coaxial with the seat of the valve, while the second part is constituted by a ball interposed between said seat and the extremity of the piston facing said seat, means being provided to establish a connection between said ball and said piston such that, while allowing the ball to be radially displaced in respect to the piston, said ball tends to follow the piston in its axial displacements, whereby the dampening effect due to the friction of the piston in its bore is transmitted to said ball.

It is particularly contemplated to limit the radial displacements of the ball in respect to the piston and, thus, in respect to the seat.

According to another feature of my invention, the piston is magnetized, while the ball is made of hard steel, so as to be attracted by said piston. Thus, the proper connection between piston and ball is established.

It is to be understood that, depending upon the operating conditions, the efficient sealing area of the valve may be rendered as small as desired by reducing the radius of curvature of the valve seat and its closure member, this radius being calculated, for instance, in a manner similar to that which allows to determine the diameter of the rolling bodies in conventional ball bearings, to thereby permit the valve to resist the operating forces exerted thereon.

Other objects and advantages of the invention will be apparent from the following detailed description, together with the accompanying drawings, submitted for purposes of illustration only and not intended to define the scope of the invention, reference being had for that purpose to the subjoined claims.

Figs. 1, 2 and 3 each show a sectional view of a different exemplification of the present invention.

In Fig. 1, I have shown an embodiment comprising a seat 1 having the shape of a convex revolution surface provided in the valve casing 5 and a piston 3*a* slidably mounted in said casing with a fit ensuring the dampening of vibrations due to variable fluid pressure conditions.

In this embodiment, the movable member is constituted of two separate parts, namely the piston 3*a* having a cylindrical wall and a ball 11 forming the valve closing member cooperating with seat 1, said ball being interposed between said seat and said piston.

The piston 3*a* is magnetized and the ball 11 is made of hard steel so as to be attracted by the piston 3*a*. The piston is provided with tongues 12 limiting the radial displacements of the ball 11 in respect to the piston 3*a*.

The fluid enters the valve casing at 7, flows through the passages 10 provided in body of the piston 3*a*, and leaves the valve casing at 8. A spring 9 urges the movable valve members 3*a*—11 towards the seat 1.

The arrangement of parts shown in Fig. 2 is similar to that of Fig. 1, except that the fluid inlet and outlet opening of the valve casing are located both on the same side of piston 3*b*.

In this arrangement, the space above piston 3*b* is opened to the atmosphere through a passage 15 and the piston is provided with a packing ring 13.

In the example of Fig. 2, the radial displacements of ball 11 in respect to the piston 3*b* are limited by shoulders 14 instead of by the tongues 12 of Fig. 1.

Referring now to Fig. 3, I have shown an arrangement similar to that of Fig. 2, with the difference that the means to limit the radial displacements of the ball 11 are constituted by a shallow recess 16 formed in the working face of piston 3*b*.

While the invention has been described with particular reference to a preferred embodiment, it is not intended to limit the scope of the invention to the embodiment illustrated, nor otherwise than by the terms of the subjoined claims.

What is claimed is:

1. A check valve assembly comprising a cylindrical valve casing having one end formed with a fluid inlet port and its other end formed with a fluid outlet port, a valve seat constituted by a circular convex surface forming part of the inlet, a damping piston member having a working face mounted in said casing to move toward and away from said valve seat, a passageway in said piston member to interconnect said fluid inlet and outlet ports through said piston member, a self-centering ball valve member inserted in said casing between said inlet port and said working face of the piston member for free transverse movement with respect to said valve seat and adapted to engage the latter in a circle of contact to thereby close said seat, one of said piston or ball members being a permanent magnet and the other being of magnetic metal so that said ball member is held by magnetic attraction on said working face of the piston member for longitudinal movement therewith while having a free transverse rolling relation thereto, a plurality of longitudinally extending tongues on said working face of the piston member to limit the transverse rolling movement of said ball member toward the inner wall of said casing, and resilient means urging said piston member toward said seat to thereby apply said ball member on said circular convex surface thereof, whereby self-centering transverse rolling movement of said ball member with respect to said circle of contact may be accomplished to bring said ball member into properly centered valve closing position.

2. A check valve assembly comprising a cylindrical valve casing formed with a fluid inlet port and a fluid outlet port, a valve seat constituted by a circular convex surface forming part of the inlet, a damping piston member having a working face mounted to move within said casing toward and away from said valve seat, a self-centering ball valve member between said inlet port and said outlet port adapted to engage said circular convex surface in a circle of contact to close said seat, one of said piston or ball members being a permanent magnet and the other being of magnetic metal so that said ball member is held by magnetic attraction on said working face of the piston member for longitudinal movement therewith while having a free transverse rolling relation thereto, a circular shallow concave recess in said working face to restrain the transverse rolling movement of said ball member toward the inner wall of said casing, and resilient means urging said piston member toward said seat to thereby apply said ball member on said circular convex surface thereof, whereby self-centering transverse rolling movement of said ball member toward said contact circle engagement may be accomplished to bring said ball member into properly centered valve closing position.

References Cited in the file of this patent

UNITED STATES PATENTS

| | | |
|---|---|---|
| 391,143 | Hadden | Oct. 16, 1888 |
| 1,001,846 | Harley | Aug. 29, 1911 |
| 1,576,269 | Durant | Mar. 9, 1926 |
| 2,042,216 | Edwards | May 26, 1936 |
| 2,097,629 | Lowrey | Nov. 2, 1937 |
| 2,541,395 | Wilson | Feb. 13, 1951 |
| 2,564,815 | Raymond | Aug. 21, 1951 |
| 2,693,767 | Vroman | Nov. 9, 1954 |
| 2,693,933 | Meinke | Nov. 9, 1954 |